US012641705B2

(12) United States Patent
Yoon

(10) Patent No.: US 12,641,705 B2
(45) Date of Patent: May 26, 2026

(54) PLASMA DEVICE FOR TREATING EXHAUST GAS

(71) Applicant: PLASMA SCIENCE SYSTEM CO., LTD., Hwaseong-si (KR)

(72) Inventor: Jong Pil Yoon, Cheonan-si (KR)

(73) Assignee: PLASMA SCIENCE SYSTEM CO., LTD. (KR)

( * ) Notice: Subject to any disclaimer, the term of this patent is extended or adjusted under 35 U.S.C. 154(b) by 960 days.

(21) Appl. No.: 17/885,505

(22) Filed: Aug. 10, 2022

(65) Prior Publication Data

US 2023/0063837 A1 Mar. 2, 2023

(30) Foreign Application Priority Data

Aug. 11, 2021 (KR) ........................ 10-2021-0105815

(51) Int. Cl.
*H05H 1/34* (2006.01)
*F23G 7/06* (2006.01)

(52) U.S. Cl.
CPC ............... *H05H 1/34* (2013.01); *F23G 7/063* (2013.01); *H05H 2242/10* (2013.01); *H05H 2245/17* (2021.05)

(58) Field of Classification Search
CPC .. H05H 1/34; H05H 2242/10; H05H 2245/17; H05H 1/32; H05H 1/3423; H05H 1/28; F23G 7/063; Y02C 20/30; B01J 12/002; B01J 3/006; B01D 53/32
See application file for complete search history.

(56) References Cited

U.S. PATENT DOCUMENTS

| | | | | |
|---|---|---|---|---|
| 5,178,332 A * | 1/1993 | Tsukakoshi | F02M 51/0639 | 29/890.143 |
| 5,749,937 A * | 5/1998 | Detering | H05H 1/34 | 75/10.21 |
| 5,772,855 A * | 6/1998 | Johnson | B01J 12/002 | 435/7.1 |
| 2006/0086822 A1* | 4/2006 | Martin | H05H 1/22 | 239/321 |
| 2008/0148905 A1* | 6/2008 | Hung | C04B 35/563 | 75/343 |

FOREIGN PATENT DOCUMENTS

KR 20180096005 A * 8/2018 ............... H05H 1/28

OTHER PUBLICATIONS

"Mastering Vacuum Evaporation: Essential Guide", 2025, .vacculex, https://www.vacculex.com/blogs/vacuum-evaporation/ p. 1 (Year: 2025).*

* cited by examiner

*Primary Examiner* — Tiffany T Tran

(74) *Attorney, Agent, or Firm* — Renaissance IP Law Group LLP

(57) ABSTRACT

The present inventive concept relates to a device for treating an exhaust gas, and more particularly, to a plasma device capable of, even when connected to a vacuum pump, extending a lifetime of an electrode of a plasma torch. In the plasma device according to the present inventive concept, since an orifice is installed in a connection unit for connection with a vacuum pump to prevent a decrease in pressure of the vacuum pump, a pressure of a plasma reaction unit including the plasma torch of the plasma device can be maintained similar to normal pressure, thereby reducing the wear of a tungsten electrode in the plasma torch to extend a lifetime of the electrode.

10 Claims, 12 Drawing Sheets

A-A'

PLASMA DEVICE FOR TREATING EXHAUST GAS

CLAIM FOR PRIORITY

This application claims priority to Korean Patent Application No. 2021-0105815 filed on Aug. 11, 2021 in the Korean Intellectual Property Office (KIPO), the entire contents of which are hereby incorporated by reference.

BACKGROUND

1. Technical Field

Example embodiments of the present inventive concept relate to a device for treating an exhaust gas, and more particularly, to a plasma device capable of, even when connected to a vacuum pump, extending a lifetime of an electrode of a plasma torch.

2. Related Art

Due to growth of the industries of semiconductors and liquid crystal displays (LCDs) and the increases in production thereof, gases used in processes are also increasing. A semiconductor manufacturing process has a number of operations, and types of gases used therein are as diverse as the many operations of the process.

For example, in a semiconductor element manufacturing process, processes such as photolithography, etching, diffusion, and metal deposition processes are repeatedly performed on wafers supplied to process chambers. During such a semiconductor manufacturing process, various process gases are used, and after the process is completed, exhaust gases are discharged from the process chambers by vacuum pumps. In this case, since the exhaust gases may include toxic components, before being discharged by the vacuum pumps, the exhaust gases are purified by exhaust gas treatment devices such as scrubbers.

Currently, the introduction of point-of-use (POU) scrubber devices for purifying harmful gases emitted from Korean IT manufacturing processes is increasing in line with increases in production amount and demand amount of semiconductors nationally and there is a need for the introduction of new technology for dealing with performance degradation of existing facilities.

Therefore, a plasma-type device for treating an exhaust gas including a perfluorinated compound (PFC), which is applicable to various sites in order to be used for a primary POU scrubber for decomposing a PFC in an exhaust gas treatment process of a current semiconductor process or used to solve a problem of frequent maintenance of a vacuum pump due to salt generation, will be described.

Specifically, the plasma-type device for treating an exhaust gas includes a plasma torch provided at an upper side to, when an exhaust gas including a PFC is introduced, decompose the exhaust gas in a region of high-temperature plasma generated by nitrogen ($N_2$) for plasma generation and received electricity, a plasma chamber provided under the plasma torch, a plasma reactor including a reaction water injection part provided to supply reaction water between the plasma torch and the plasma chamber, and a connection unit provided under and communicating with the plasma reactor to move a gas, which is decomposed through the plasma reactor, to a vacuum pump.

However, when the plasma-type device for treating an exhaust gas is connected to the vacuum pump, vacuum affects the plasma reactor through the connection unit of the plasma-type device for treating an exhaust gas, a boiling point of tungsten used as an anode of the plasma reactor is lowered due to low pressure to vaporize the tungsten, and thus there has been a problem in that lifetime/performance is reduced.

SUMMARY

Example embodiments of the present inventive concept provide a plasma device for treating an exhaust gas, which is capable of, even when connected to a vacuum pump, extending a lifetime of an electrode.

In order to achieve the above object, the present inventive concept provides a plasma device for treating an exhaust gas.

In some example embodiments, a plasma device for treating an exhaust gas, which is connected to a vacuum pump, includes a plasma reaction unit which includes a plasma torch, an exhaust gas injection part provided under the plasma torch, a reaction chamber provided under the exhaust gas injection part, and a coolant chamber provided to supply a coolant to the plasma torch and the reaction chamber, a cooling unit which is formed under and communicates with the plasma reaction unit and includes a passage and a coolant chamber configured to surround the passage, and a connection unit configured to connect the cooling unit and a vacuum pump.

An orifice may be provided in the connection unit to prevent a pressure drop due to the vacuum pump.

The orifice may include a body configured to block a passage of the connection unit, and at least one orifice hole formed in a portion of the body.

A size of the orifice hole may be increased in proportion to an inflow flow rate of an exhaust gas.

In the plasma reaction unit, the plasma torch, the exhaust gas injection part, and the reaction chamber may be integrally formed.

The plasma torch may include a cathode having a solid columnar shape, a cathode body formed to surround the cathode and including a convex portion of which a lower portion is convex, a cover configured to cover upper portions of the cathode and the cathode body, an anode body disposed under the cathode body to be spaced a certain distance from the cathode body, a plasma-generating gas supply part disposed between the cathode body and the anode body and configured to supply a plasma-generating gas for generating plasma, and a coolant supply part configured to supply the coolant to the cathode body and the anode body.

A certain portion of one lower end portion of the cathode may be exposed from the cathode body.

An arc generation portion formed as a groove having a cylindrical shape may be formed inside the convex portion such that a vortex of the plasma-generating gas is generated.

A discharge part having a cylindrical shape, of which a diameter increases downward, may be formed inside the anode body.

The plasma-generating gas supply part may include a body having a ring shape provided with an internal space, and a plasma-generating gas injection pipe formed in the body to inject a gas.

The plasma-generating gas injection pipe may be formed as two plasma-generating gas injection pipes in contact with the space in the body in a circumferential direction, and the two plasma-generating gas injection pipes may be disposed to form an angle of 180°.

A diameter of a gas outlet of the plasma-generating gas injection pipe may be less than a diameter of a gas inlet thereof.

In the coolant chamber provided in each of the reaction chamber and the cooling unit, in order to prevent formation of gas bubbles, the coolant inlet may be provided at a bottom of the coolant chamber, and a coolant outlet may be provided at a top of the coolant chamber.

BRIEF DESCRIPTION OF DRAWINGS

Example embodiments of the present inventive concept will become more apparent by describing example embodiments of the present inventive concept in detail with reference to the accompanying drawings, in which.

DESCRIPTION OF EXAMPLE EMBODIMENTS

Figure 1:
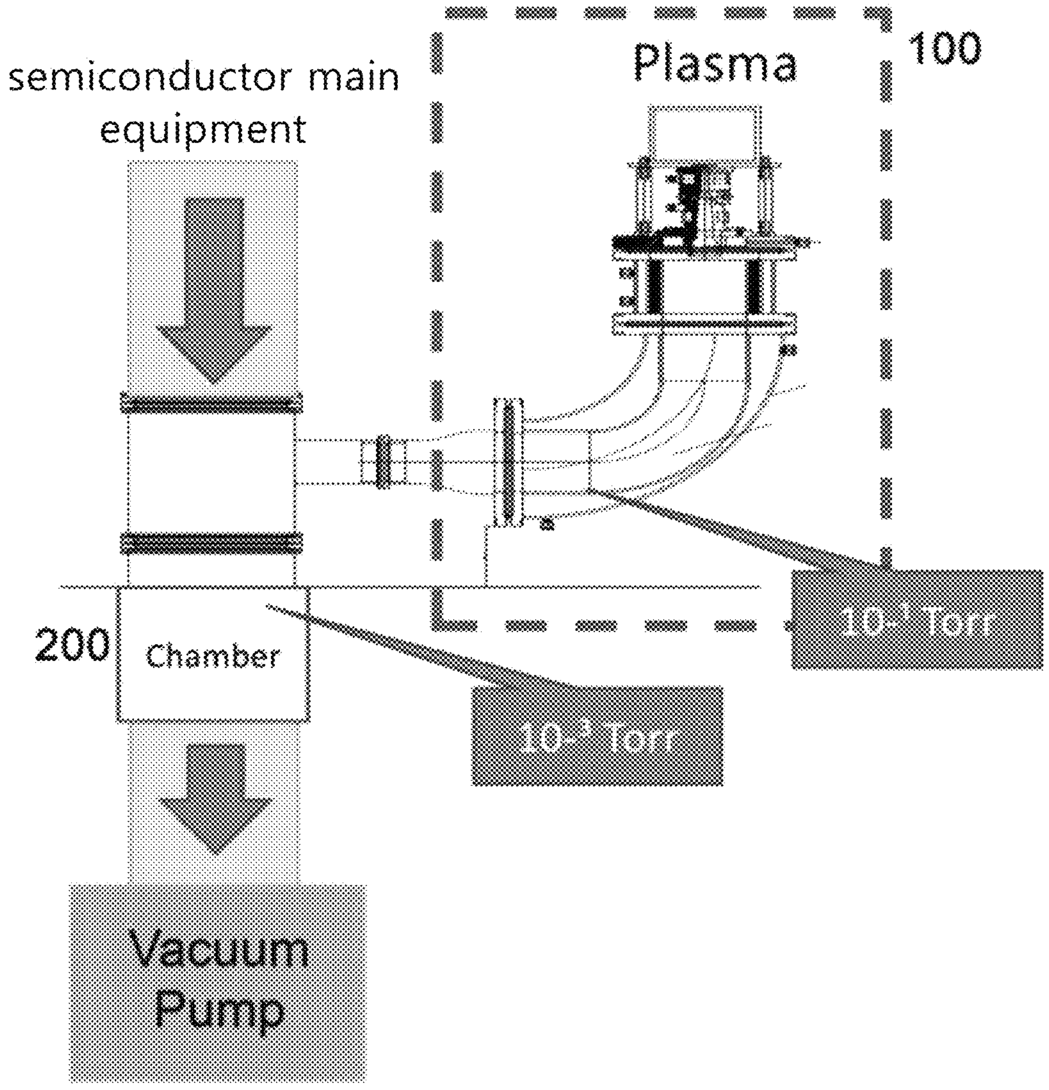
FIG. 1 is a schematic view illustrating a state in which a plasma device for treating an exhaust gas according to one example embodiment of the present inventive concept is connected to a vacuum pump.

The present inventive concept can be modified in various forms and can have various example embodiments. Specific example embodiments will be shown in the accompanying drawings and described in detail. However, it is not intended that the present inventive concept is limited to the specific example embodiments, and it is interpreted that all the conversions, equivalents, and substitutions belonging to the concept and technical scope of the present inventive concept are included in the present inventive concept. In describing the present inventive concept, when it is determined that detailed descriptions of known techniques involved in the present inventive concept make the gist of the present inventive concept obscure, the detailed descriptions thereof will be omitted.

Hereinafter, example embodiments according to the present inventive concept will be described in detail with reference to the accompanying drawings, and in describing the example embodiments with reference to the accompanying drawings, the same or corresponding components are assigned with the same reference numerals, and redundant descriptions thereof will be omitted.

FIG. 1 is a schematic view illustrating a state in which a plasma device for treating an exhaust gas according to one example embodiment of the present inventive concept is connected to a vacuum pump.

Referring to FIG. 1, a plasma device 100 according to the present inventive concept may be a device for treating an exhaust gas, which treats an exhaust gas generated in a semiconductor process to flow toward the vacuum pump. The plasma device 100 according to the present inventive concept may be applied as a device which prevents by-products caused by a special gas discharged to the vacuum pump in a semiconductor main process from flowing into the vacuum pump to cause problems in pump maintenance and facility operation. Accordingly, the efficiency of pump maintenance and facility operation can be improved, and a V/P lifetime of a vacuum pump can be improved.

Figure 2:
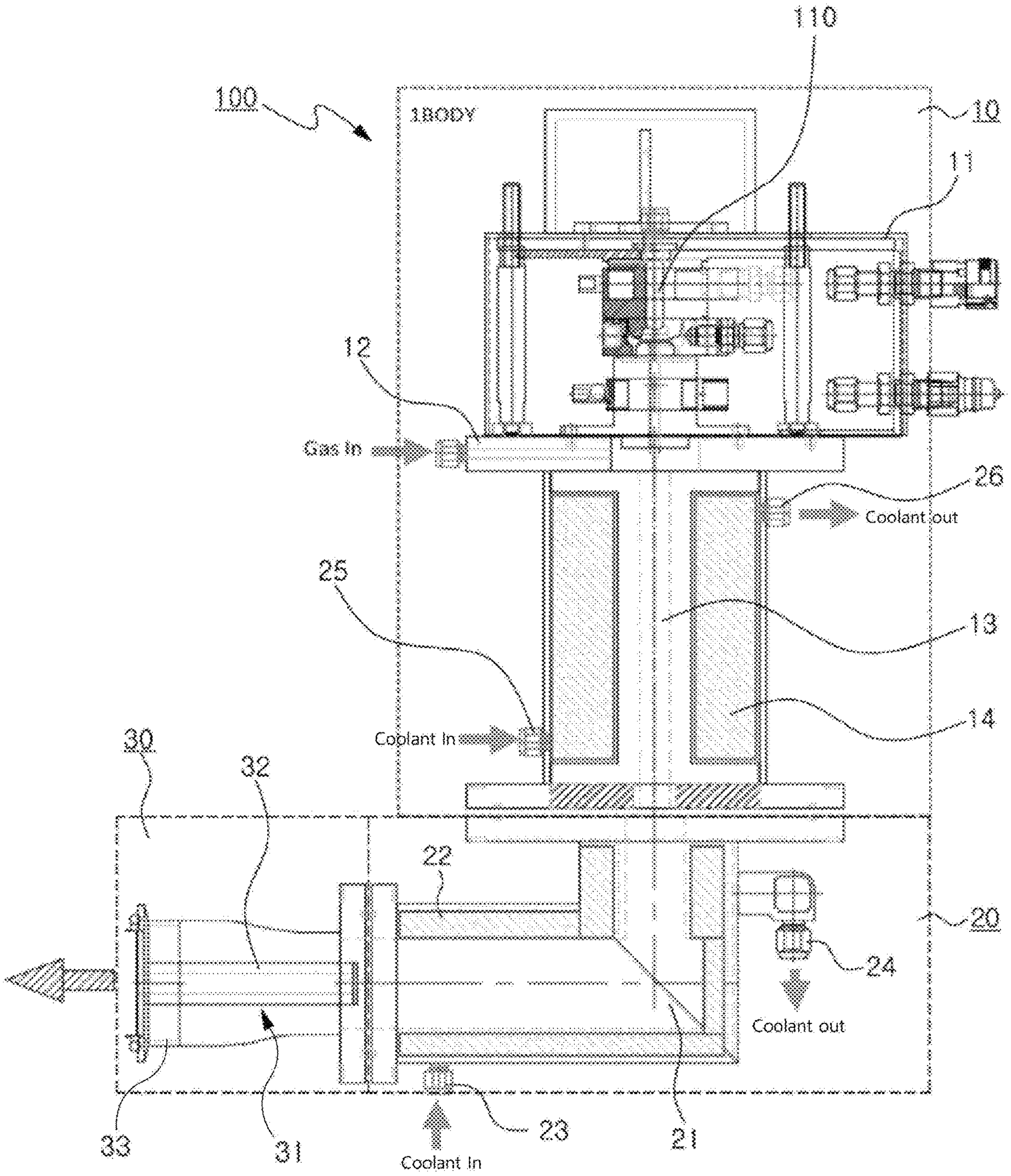
FIG. 2 is a schematic view illustrating the plasma device for treating an exhaust gas according to one example embodiment of the present inventive concept.

FIG. 2 is a schematic view illustrating the plasma device for treating an exhaust gas according to one example embodiment of the present inventive concept.

Referring to FIG. 2, the plasma device 100 for treating an exhaust gas according to the present inventive concept includes a plasma reaction unit 10, a cooling unit 20, and a connection unit 30.

The plasma reaction unit 10 includes a plasma torch 11, an exhaust gas injection part 12 provided under the plasma torch, a reaction chamber 13 provided under the exhaust gas injection part, and a coolant chamber 14 provided to supply a coolant to the plasma torch and the reaction chamber.

As the plasma torch 11, a plasma torch known in the art may be used, for example, a radio frequency (RF) plasma torch, a microwave plasma torch, an arc plasma torch, or the like may be used, but the present inventive concept is not limited thereto.

Preferably, the arc plasma torch may be used as the plasma torch and may have the following configuration.

Figure 3:
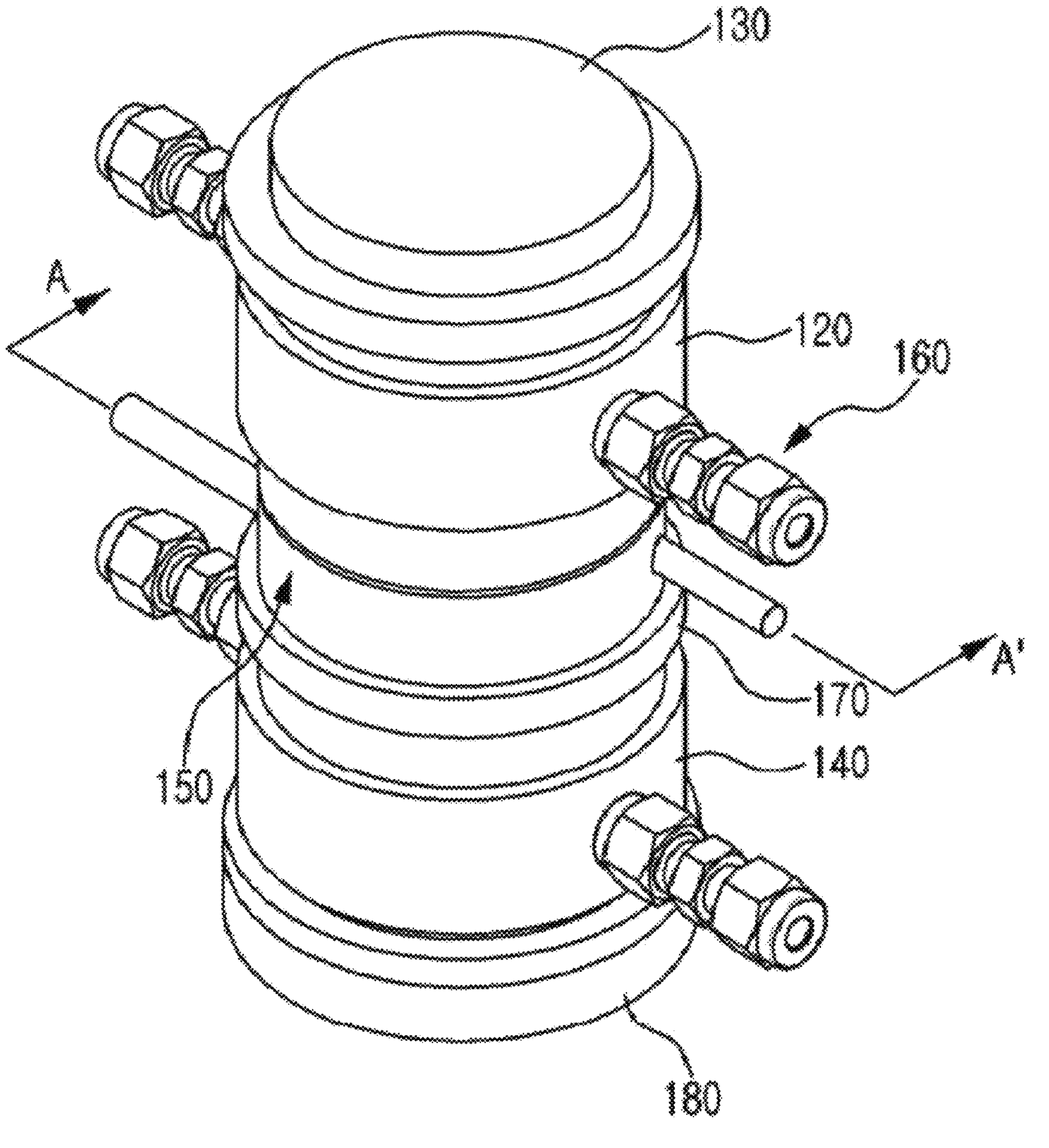
FIG. 3 is a perspective view illustrating a plasma torch which is one component in the plasma device according to one example embodiment of the present inventive concept.
Figure 4:
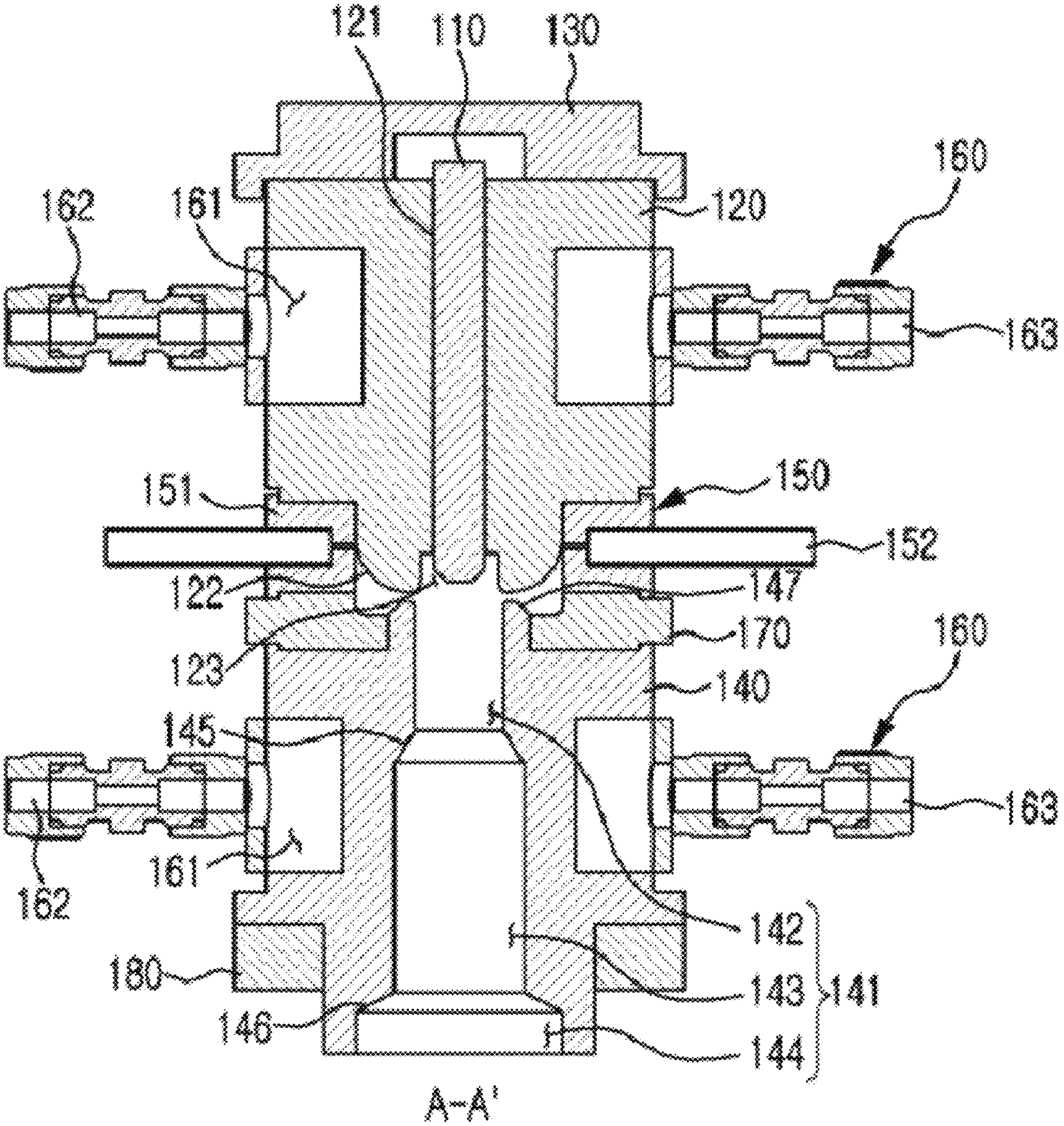
FIG. 4 is a cross-sectional view illustrating the plasma torch which is one component in the plasma device according to one example embodiment of the present inventive concept.

FIG. 3 is a perspective view illustrating the plasma torch which is one component in the plasma device according to one example embodiment of the present inventive concept. FIG. 4 is a cross-sectional view illustrating the plasma torch which is one component in the plasma device according to one example embodiment of the present inventive concept.

Referring to FIGS. 3 and 4, the plasma torch 11 according to the present inventive concept includes a cathode 110, a cathode body 120, a cover 130, an anode body 140, a plasma-generating gas supply part 150, and a coolant supply part 160.

The cathode 110 may have a solid columnar shape formed to be vertically elongated. An upper cross section of the cathode 110 may have a flat shape, but a lower cross section thereof may have a hemispherical shape that is convex downward. This is so that, when a plasma-generating gas supplied from the gas supply part 150 to be described below rotates to generate a vortex under the cathode 110, the vortex can be effectively generated without interruption of the generation of the vortex.

In addition, a material of the cathode 110 may preferably be tungsten. In a related art, in order to manufacture the cathode 110 made of tungsten, since the cathode 110 has been manufactured by condensing a tungsten powder at a high temperature to form a frame, the frame is not robust. Thus, there has been a problem in that a lifetime of the cathode is shortened when a plasma torch is operated. However, the cathode 110 of the present inventive concept is manufactured through a method of processing pure tungsten rather than a method of condensing a tungsten powder at a high temperature as in the related art. Therefore, the cathode 110 of the present inventive concept can be manufactured more robustly than the cathode of the related art, thereby extending a lifetime of the cathode 110.

The cathode body 120 may be formed to surround the cathode 110. An electrode accommodation hole 121 may be formed in a central portion inside the cathode body 120 to accommodate the cathode 110. In addition, a lower portion of the cathode body 120 may include a convex portion 122 having a shape that is convex downward, and an arc generation portion 123 formed as a groove having a cylindrical shape may be formed inside the convex portion 122 such that a vortex of a plasma-generating gas is generated. That is, the electrode accommodation hole 121 formed in the cathode body 120 and the arc generation portion 123 formed at the lower portion of the cathode body 120 may communicate with each other. A diameter of the formed arc generation portion 123 is preferably formed to be greater than a diameter of the electrode accommodation hole 121.

The cathode 110 may be inserted and mounted in the electrode accommodation hole 121 of the cathode body 120, and a lower cross section of the cathode 110, that is, a portion of the cathode 110 having a convex hemispherical shape, may be disposed to be exposed at the arc generation portion 123 of the cathode body 120. Accordingly, the arc generation portion 123 of the cathode body 120 may have a shape that surrounds the lower cross section of the cathode 110.

In addition, the coolant supply part 160 may be included in the cathode body 120 such that a coolant flows inside the cathode body 120 to cool heat generated by plasma. The coolant supply part 160 may include a cooling hole 161 formed inside the cathode body 120 such that a coolant flows into the cathode body 120, a coolant inlet 162 formed so that a coolant is injected into the cathode body 120, and a coolant outlet 163 formed so that a coolant is discharged after flowing inside the cathode body 120 to cool heat.

The cover 130 may cover the other end portion of the cathode 110 and an upper portion of the cathode body 120. In addition, the cover 130 may be formed of an insulating material. In this case, the insulating material may be formed of polyvinyl chloride, Teflon, ceramic, or the like. Accordingly, the cover 130 can effectively insulate the cathode 110 and the cathode body 120.

The anode body 140 may be disposed under the cathode body 120 to be spaced a certain distance from the cathode body 120. An upper portion of the anode body 140 may be installed apart from the cathode body 120 to serve as a positive polarity electrode body for accommodating an arc generated from the cathode body 120. Preferably, the anode body 140 may be formed of copper having high electrical conductivity. In addition, a discharge part 141 may be included inside the anode body 140 to discharge a gas, nitrogen gas, and plasma after a thermal decomposition reaction.

The discharge part 141 of the anode body 140 may be formed in a cylindrical shape. A diameter of the discharge part 141 may be increased downward, and the discharge part 141 may be divided into a first discharge portion 142, a second discharge portion 143, and a third discharge portion 144. That is, a diameter of the second discharge portion 143 may be greater than a diameter of the first discharge portion 142, and a diameter of the third discharge portion 144 may be greater than the diameter of the second discharge portion 143.

A first inclined portion 145 may be formed between the second discharge portion 143 and the first discharge portion 142 so that the diameter of the second discharge portion 143 is formed to be greater than the diameter of the first discharge portion 142. That is, the first inclined portion 145 may be inclined such that a diameter thereof is increased downward. The inclined portion 145 may preferably have an inclination of 130° or more and 150° or less and more preferably have an inclination of 140° to, when a plasma-generating gas is discharged through the discharge part 141, increase a contact surface between the discharged gas and the discharge part 141 and to allow the discharged gas to rotate at a high speed therein and effectively generate a vortex. In addition, the diameter of the third discharge portion 144 may be greater than the diameter of each of the first discharge portion 142 and the second discharge portion 143. That is, a second inclined portion 146 may be formed between the third discharge portion 144 and the second discharge portion 143 so that the diameter of the third discharge portion 144 is formed to be greater than the diameter of the second discharge portion 143.

As described above, the size of the discharge part 141 of the anode body 140 of the plasma torch 11 according to the present inventive concept may be divided into three stages, and the inclined portions 145 and 146 may be formed between the respective discharge portions 142, 143, and 144 to expand the discharge part 141 so that a contact surface between a discharged gas and the discharge part 141 can be increased as much as possible. Thus, the discharged gas can be discharged while being rotated at a high speed inside the discharge part 141. Since the discharged gas rotated at a high speed can generate a strong vortex inside the discharge part 141, waste gas can be treated with high efficiency even at low power, thereby obtaining an effect of reducing energy consumption.

In addition, a protrusion 147 may be formed at the upper portion of the anode body 140 to protrude around the discharge part 141. The protrusion 147 of the anode body 140 may serve to guide a gas sprayed from the gas supply part 150 to flow toward the arc generation portion 123 of the cathode body 120 at a high speed.

As in the cathode body 120, a coolant supply part 160 may be included in the anode body 140 such that a coolant flows inside the anode body 140 to cool heat generated by plasma. The coolant supply part 160 may include a cooling hole 161 formed inside the anode body 140 such that a coolant flows into the anode body 140, a coolant inlet 162 formed so that a coolant is injected into the anode body 140, and a coolant outlet 163 formed so that a coolant is discharged after flowing inside the anode body 140 to cool. That is, the coolant supply part 160 may be formed in each of the cathode body 120 and the anode body 140.

The plasma-generating gas supply part 150 may be disposed in a ring shape between the cathode body 120 and the anode body 140. More specifically, the plasma-generating gas supply part 150 may be disposed in a shape inserted into the convex portion 122 of the cathode body 120.

The plasma-generating gas supply part 150 may supply a plasma-generating gas for generating plasma inside the plasma torch 11 into the torch. For example, the plasma-generating gas may be $N_2$ gas.

In addition, the plasma-generating gas supply part 150 may include a cylindrical body 151 having an internal space, and a plasma-generating gas injection pipe 152 formed in the body 151 to inject a plasma-generating gas.

Figure 5:
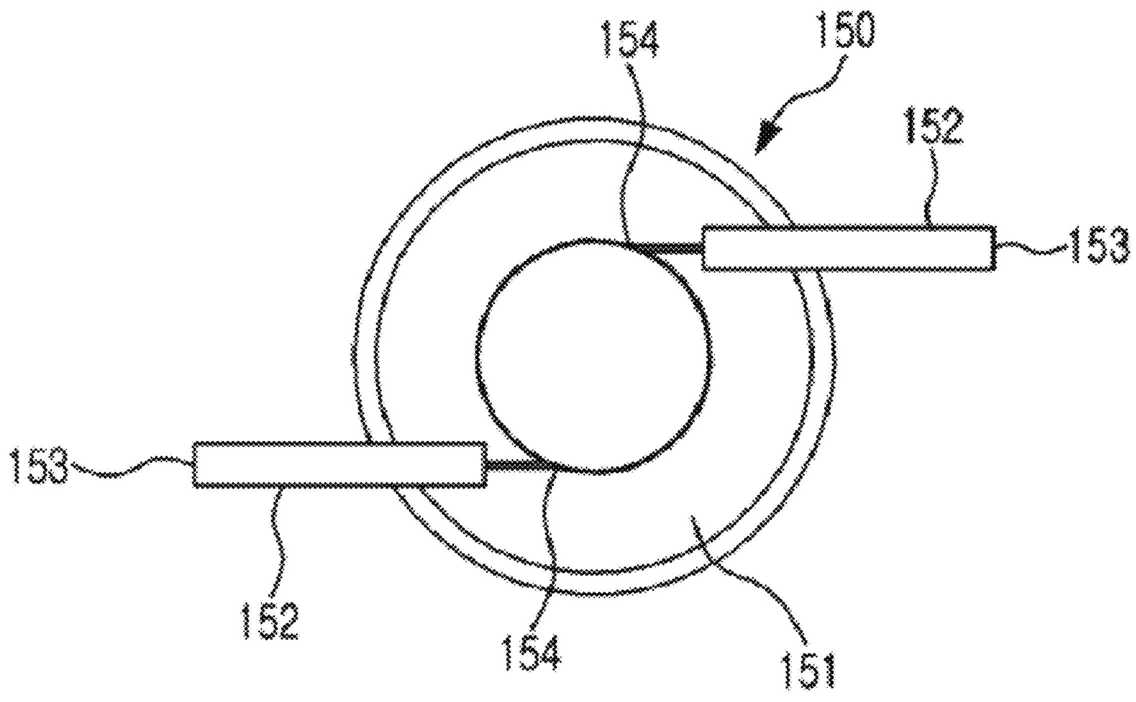
FIG. 5 is a view illustrating a plasma-generating gas supply part of the plasma torch which is one component in the plasma device according to one example embodiment of the present inventive concept.

FIG. 5 is a view illustrating the plasma-generating gas supply part 150 of the plasma torch according to one example embodiment of the present inventive concept.

Referring to FIG. 5, the body 151 of the plasma-generating gas supply part 150 has a ring shape provided with an internal space and may be mounted in a shape inserted into the convex portion 122 of the cathode body 120.

As shown in FIG. 5, the plasma-generating gas injection pipe 152 of the plasma-generating gas supply part 150 is formed in contact with the space inside the body 151 in a circumferential direction, and it is preferable that two plasma gas injection pipes 152 are disposed to form an angle of 180°. In addition, in order to increase a discharge pressure of a gas discharged through the plasma-generating gas injection pipe 152, a plasma-generating gas outlet 154 of the plasma-generating gas injection pipe 152 may be formed to have a diameter that is less than a diameter of a plasma-generating gas inlet 153. That is, since the diameter of the plasma-generating gas outlet 154 is less than the diameter of the plasma-generating gas inlet 153 of the plasma-generating gas injection pipe 152, a gas discharged through the plasma-generating gas outlet 154 can be strongly sprayed, and a strong vortex can be formed by a structure in which the gas injection pipes 152 are disposed apart from each other at an angle of 180°.

It is preferable that the plasma-generating gas outlet 154 of the plasma-generating gas injection pipe 152 is disposed at a position such that the plasma-generating gas outlet 154 faces the convex portion 122 when the plasma-generating gas supply part 150 is inserted into the convex portion 122 of the cathode body 120. This is to guide a gas to the arc generation portion 123 of the cathode body 120 by allowing a discharged gas sprayed from the gas outlet 154 to flow along the convex portion 122 of the cathode body 120.

Figure 6:
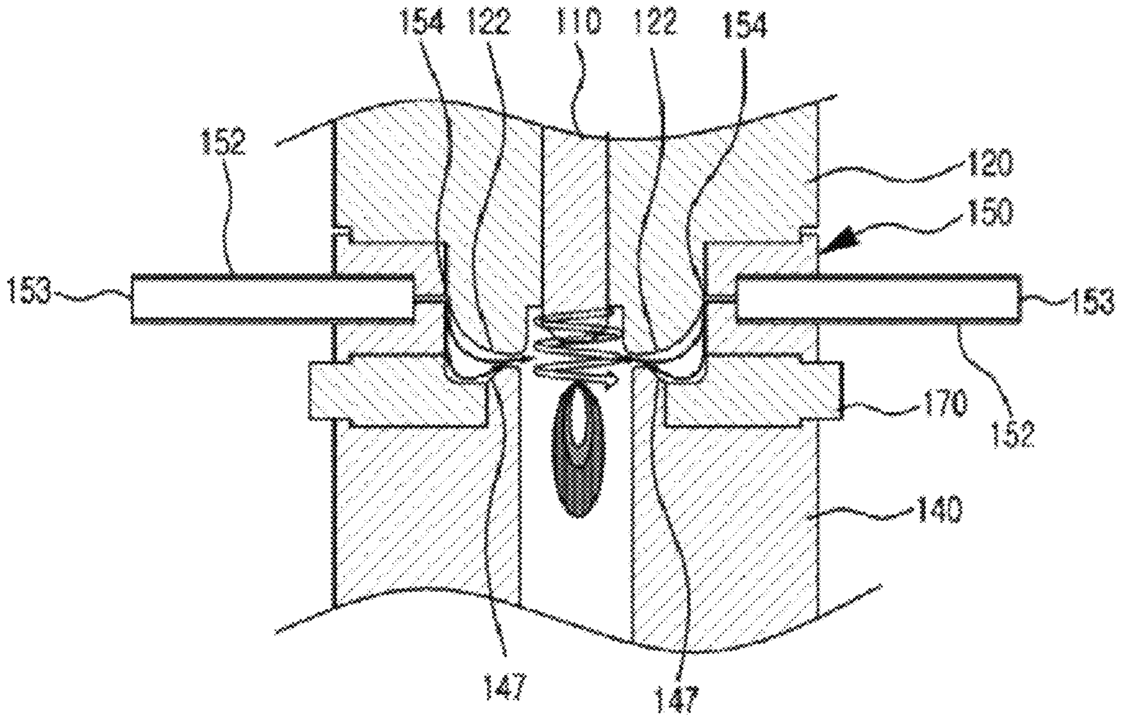
FIG. 6 is a view illustrating a flow of a plasma-generating gas inside the plasma torch which is one component in the plasma device according to one example embodiment of the present inventive concept.

FIG. 6 is a view illustrating a flow of a plasma-generating gas inside the plasma torch in the plasma device of the present inventive concept.

Referring to FIG. 6, a plasma-generating gas injected through the plasma-generating gas supply part 150 is sprayed into the body 151 through the two plasma-generating gas injection pipes 152 of the plasma-generating gas supply part 150. The sprayed gas is strongly introduced toward the arc generation portion 123 of the cathode body 120 through the protrusion 147 of the anode body 140 and the convex portion 122 of the cathode body 120. The gas strongly introduced into the arc generation portion 123 rotates at a high speed in the arc generation portion 123 having a cylindrical shape to generate a strong vortex. Since stable plasma can be maintained when plasma is generated by such a vortex, gas treating efficiency can be increased even in a low power operation.

In addition, when a vortex of the sprayed plasma-generating gas is weak, there is a problem in that an electrode is abraded at a point at which an arc is generated during plasma discharge. However, in the plasma torch of FIGS. 5 and 6 according to one example embodiment of the present inventive concept, due to a gas strongly sprayed by the plasma-generating gas injection pipe 152 and a structure of the arc generation portion 123 having a groove shape formed at the lower portion of the cathode body 120, a strong vortex is generated to maintain constant plasma, thereby reducing an electrode from being abraded. Therefore, a lifetime of an electrode can be extended to more than twice that of a conventional plasma torch.

Referring again to FIGS. 3 and 4, a first insulating portion 170 and a second insulating portion 180 may be further included in upper and lower portions of the anode body 140, respectively.

The first insulating portion 170 may be formed to surround the protrusion 147 of the anode body 140. The first insulating portion 170 is disposed under the gas supply part 150 and serves to maintain a distance between electrodes so as to insulate the cathode body 120 and the anode body 140 from each other. As a material of the first insulating portion 170, an insulating material having excellent heat resistance and rigidity may be used, but the present inventive concept is not limited thereto.

The second insulating portion 180 may be formed to surround the lower portion of the anode body 140. The second insulating portion 180 may be disposed between the anode body 140 and a plate for supporting the anode body 140 to insulate the anode body 140 from the plate. As a material of the second insulating portion 180, an insulating material having excellent heat resistance and rigidity may be used, but the present inventive concept is not limited thereto.

Plasma formed in the plasma torch is moved to the reaction chamber 13 provided under the plasma torch by a vortex.

Meanwhile, the exhaust gas injection part 12 is formed between the plasma torch and the reaction chamber. An exhaust gas injected from the exhaust gas injection part 12 moves to the reaction chamber 13 provided under the exhaust gas injection part.

In the reaction chamber 13, the exhaust gas injected from the exhaust gas injection part 12 may react with plasma, and the plasma may decompose perfluoride to generate decomposed gases.

That is, since the plasma reaction unit according to the present inventive concept is provided with the reaction chamber 13, an exhaust gas is not directly injected into the plasma torch but is introduced into the reaction chamber 13 positioned under the plasma torch and does not affect an electrode of the plasma torch, thereby improving a lifetime of the electrode of the plasma torch.

The decomposed gas is present at a high temperature by high-temperature plasma. In order for the decomposed gas to be discharged to the outside, the decomposed gas is first cooled by a coolant filling the coolant chamber 14 formed in the reaction chamber 13 and is moved to the cooling unit 20 positioned under the reaction chamber 13.

The coolant chamber 14 is provided to supply a coolant to the plasma torch, the reaction chamber, and a wall surface of the cooling unit to be described below. In this case, the coolant chamber provided in the plasma torch includes the coolant supply part 160, the cooling hole 161, the coolant inlet 162, and the coolant outlet 163, and the details thereof are as described above.

In the coolant chamber 14 formed in the reaction chamber 13, in order to prevent the formation of gas bubbles, it is preferable that the cooling of gas is performed from a bottom thereof. Accordingly, in the coolant chamber 14 provided in the reaction chamber 13, a coolant inlet 25 may be installed at the bottom of the coolant chamber, and a coolant outlet 26 may be installed at a top of the coolant chamber, but the present inventive concept is not limited thereto.

In the plasma reaction unit, the plasma torch 11, the exhaust gas injection part 12, and the reaction chamber 13 may be integrally manufactured to stably perform plasma formation and reaction.

The cooling unit 20 is provided under and communicates with the plasma reaction unit 10 and serves to lower a temperature of a gas decomposed through the plasma reaction unit before the decomposed gas moves to the vacuum pump. The cooling unit 20 may include a double structure elbow part of a moving passage 21 and a coolant chamber 22 to obtain an effect of cooling an inner tube.

In this case, in order to prevent the formation of gas bubbles, it is preferable that the cooling of a gas is performed from a bottom. Accordingly, even in the coolant chamber 22 provided in the cooling unit 20, a coolant inlet 23 may be installed at an end (bottom) of the coolant chamber, and a coolant outlet 24 may be installed at a top of the coolant chamber, but the present inventive concept is not limited thereto.

The connection unit 30 is a unit that connects the plasma device to the vacuum pump.

However, since the vacuum pump maintains a vacuum degree of $10^{-3}$ Torr, when the plasma device according to the present inventive concept is connected directly to the vacuum pump, a vacuum degree close to $10^{-3}$ Torr is also formed inside the plasma reaction unit through the connection unit of the plasma device, and thus a boiling point of a tungsten electrode in the plasma torch is lowered by low pressure to vaporize the tungsten electrode, which causes a problem of degradation of lifetime/performance.

Accordingly, while studying a method of preventing a pressure drop in the plasma device due to a vacuum pump, the present inventors found that by installing an orifice 31 in the connection unit 30 to control a gas flow rate and prevent a pressure drop inside the plasma reaction unit including the plasma torch, the vaporization of the tungsten electrode in the plasma torch could be suppressed and a lifetime improved.

Therefore, in the plasma device according to the present inventive concept, the connection unit 30 is characterized by including the orifice 31.

The orifice 31 includes an orifice body 33 blocking a passage of the connection unit and an orifice pipe 32 protruding from the orifice body 33 toward the cooling unit with a hole formed at its center.

The hole of orifice pipe 32 penetrates the orifice body 33 and the decomposed gas is supplied to the vacuum pump. For example, the orifice hole may have a size of a circle having a diameter of about 3 mm to 5 mm, but the size may be increased in proportion to an inflow flow rate of an exhaust gas. However, when the size of the orifice hole is formed too large compared with the inflow flow rate of the exhaust gas, a pressure drop preventing effect is lowered, which causes a problem in that the electrode is continuously abraded due to the evaporation of the tungsten electrode in the plasma torch.

The present inventive concept will be described in more detail through the following Experimental Examples. The following Experimental Examples are given only to illustrate the present inventive concept and are not intended to limit the scope of the present inventive concept.

EXPERIMENTAL EXAMPLE

The following experiment was performed to investigate how an orifice installed in a connection unit 30 affects the wear of a tungsten electrode in a plasma torch when a plasma device equipped with a plasma torch of the present inventive concept is connected to a vacuum pump.

As shown in FIG. 2, a plasma device, which includes a plasma reaction unit 10 including a plasma torch 11, an exhaust gas injection part 12 provided under the plasma torch, a reaction chamber 13 provided under the exhaust gas injection part, and a coolant chamber 14 provided to supply a coolant to the plasma torch and the reaction chamber, a cooling unit 20 formed under and communicating with the plasma reaction unit, and a connection unit 30, was manufactured.

In the plasma device, when an orifice was installed in the connection unit and when an orifice was not installed in the connection unit, a wear length of a tungsten electrode inside the plasma torch according to an operating time was measured while connecting the plasma device to a vacuum pump and driving the plasma device.

Figure 7:
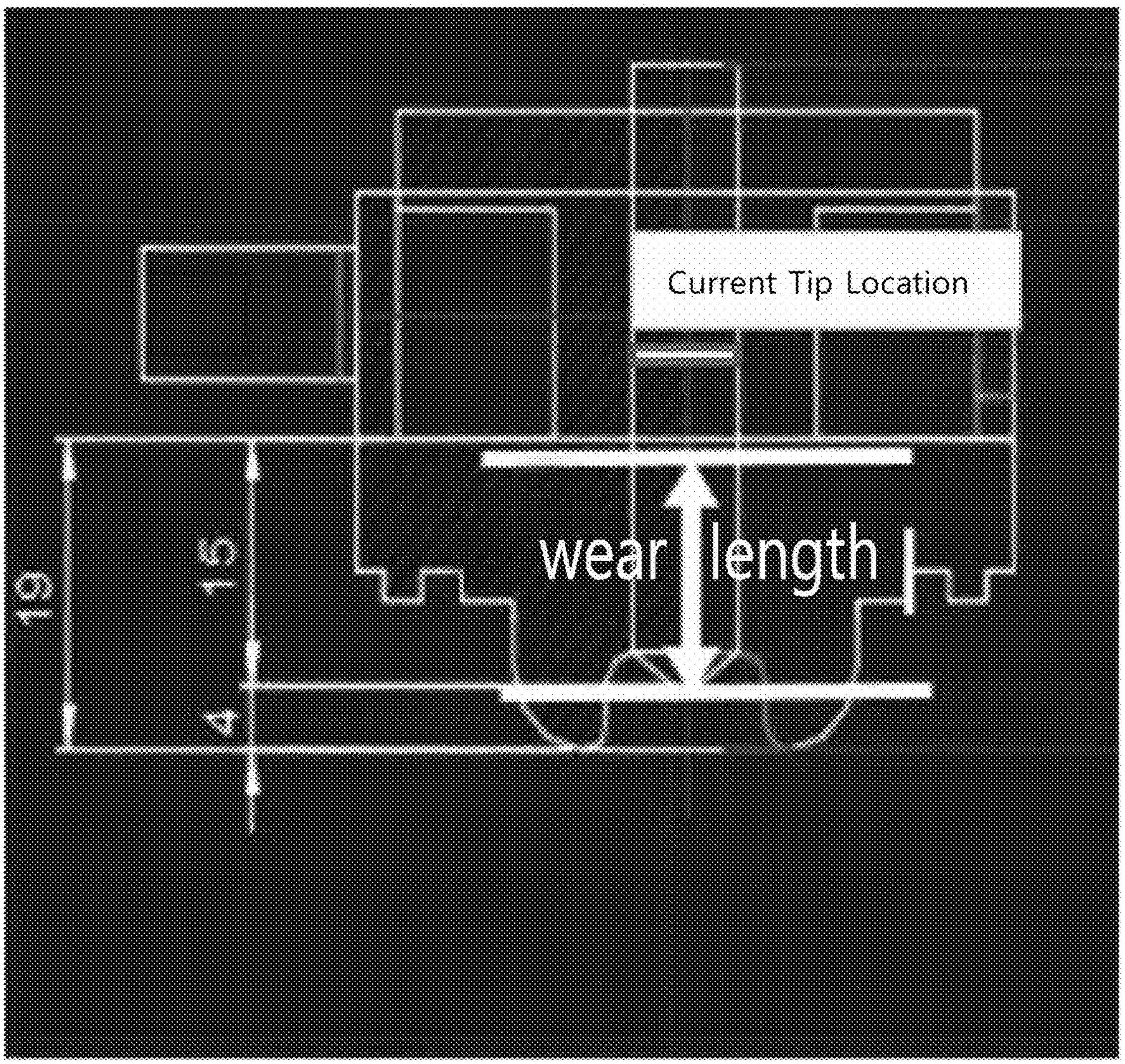
FIG. 7 is a view illustrating measurement of a wear length of a tungsten electrode inside the plasma torch which is one component in the plasma device according to one example embodiment of the present inventive concept.

FIG. 7 is a view illustrating measurement of a wear length of the tungsten electrode inside the plasma torch which is one component in the plasma device according to one example embodiment of the present inventive concept.

As shown in FIG. 7, the wear length of the tungsten electrode represents a length obtained by subtracting a length of the tungsten electrode after driving of the device from a length of the tungsten electrode before the driving of the device. When the tungsten electrode was abraded by 5 mm, the tungsten electrode was determined to have reached the end of its life.

Figure 8:
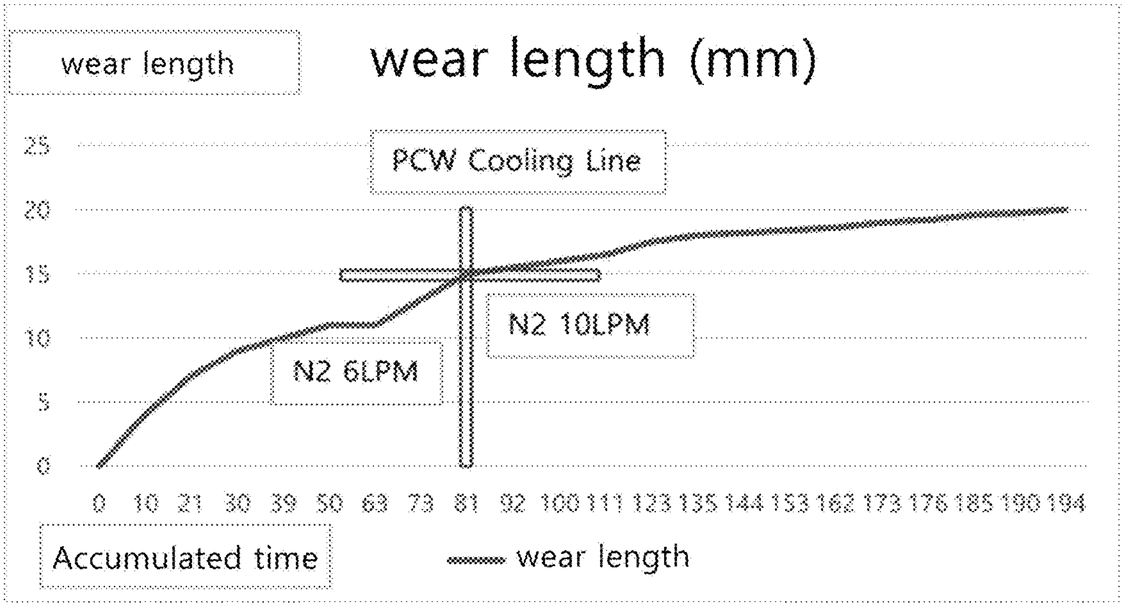
FIG. 8 is a graph showing a wear length of a tungsten electrode inside the plasma torch according to an operating time when an orifice which is one component is not included in the plasma device according to one example embodiment of the present inventive concept.

First, when the orifice was not installed in the connection unit, the wear length of the tungsten electrode inside the plasma torch according to the operating time of the plasma device was measured and is shown in Table 1 and FIG. 8. The plasma device was operated for an average of 10 hours per day.

TABLE 1

| Day | Pump $N_2$ (L/m) | Supply $N_2$ (L/m) | Current (A) | Voltage (V) | Wear length of tungsten electrode (mm) |
|---|---|---|---|---|---|
| Day 1 | 23 | 6 | 20 | 80 | 4 |
| Day 2 | 23 | 6 | 20 | 90 | 7 |
| Day 3 | 23 | 6 | 20 | 95 | 9 |
| Day 4 | 23 | 6 | 20 | 100 | 10 |
| Day 5 | 23 | 6 | 20 | 100 | 11 |
| Day 6 | 23 | 6 | 20 | 105 | 11 |
| Day 7 | 23 | 6 | 20 | 120 | 13 |
| Day 8 | 23 | 10 | 20 | 120 | 15 |

FIG. 8 is a graph showing a wear length of the tungsten electrode inside the plasma torch according to an operating time of the plasma device connected to the vacuum pump when the orifice which is one component was not installed in the connection unit in the plasma device according to one example embodiment of the present inventive concept.

As shown in Table 1 and FIG. 8, in the plasma device according to the present inventive concept, when the orifice was not installed in the connection unit, the tungsten electrode inside the plasma torch of the plasma device connected to the vacuum pump had a lifetime of only 81 hours (about 8 days), and thus it was confirmed that the plasma device would be difficult to further apply in the field.

On the other hand, as Comparative Example, when the orifice was not installed in the connection unit in the plasma device according to the present inventive concept, the plasma device was installed and operated in a semiconductor process at normal pressure, and a wear length of the tungsten electrode inside the plasma torch according to an operating time was measured and is shown in Table 2. The plasma device was operated for about 600 days.

TABLE 2

| Day | Supply $N_2$ (L/m) | Current (A) | Voltage (V) | Wear length of tungsten electrode (mm) |
|---|---|---|---|---|
| Before operation | 40 | 22 | 207 | 0 |
| Day 250 | 40 | 22 | 204 | 0.4 |
| Day 600 | 40 | 22 | 205 | 0.4 |

Figure 9:
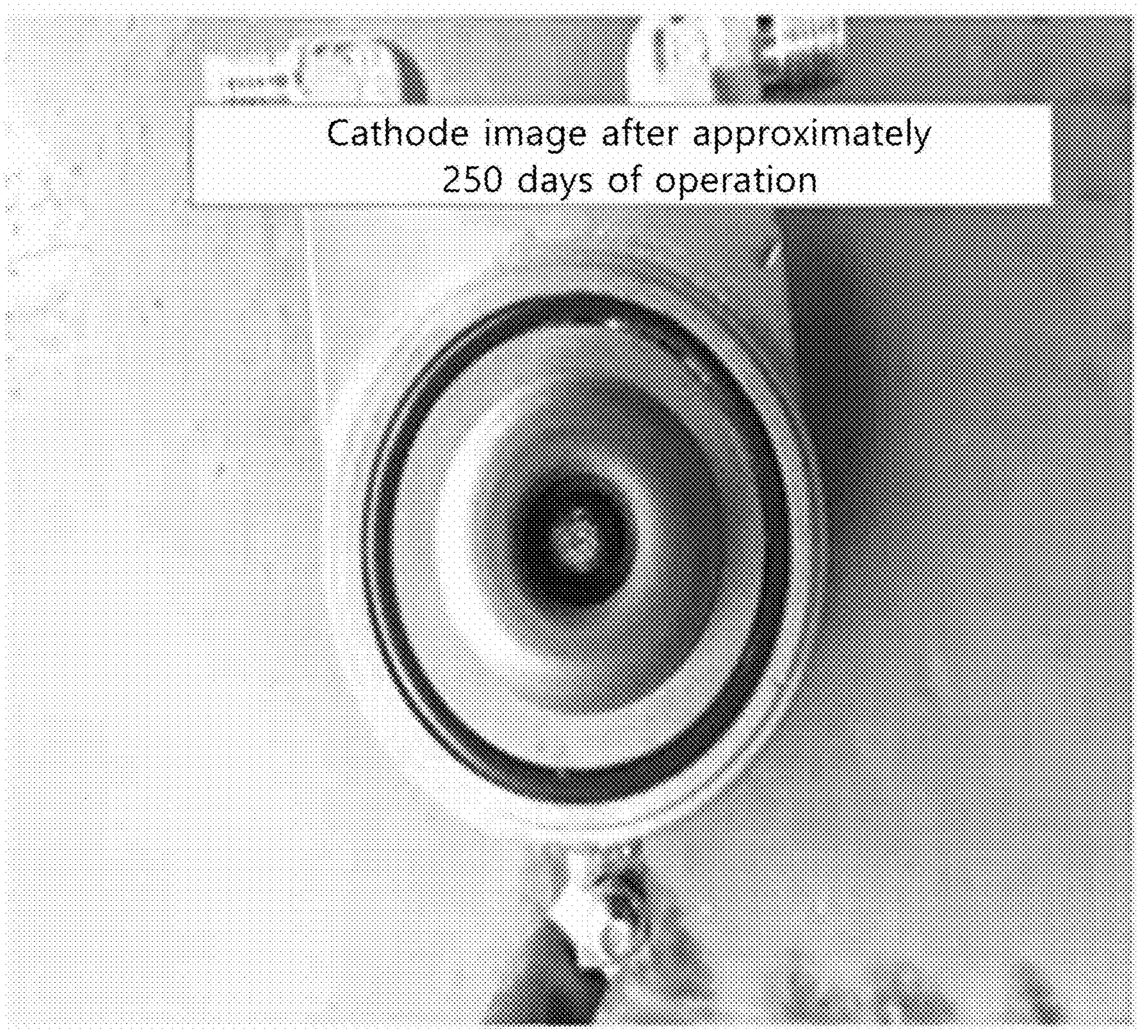
FIG. 9 is an image showing a wear state of a tungsten electrode inside the plasma torch according to an operating time at normal pressure when an orifice which is one component is not included in the plasma device according to one example embodiment of the present inventive concept (after about 250 days of operation)
Figure 10:
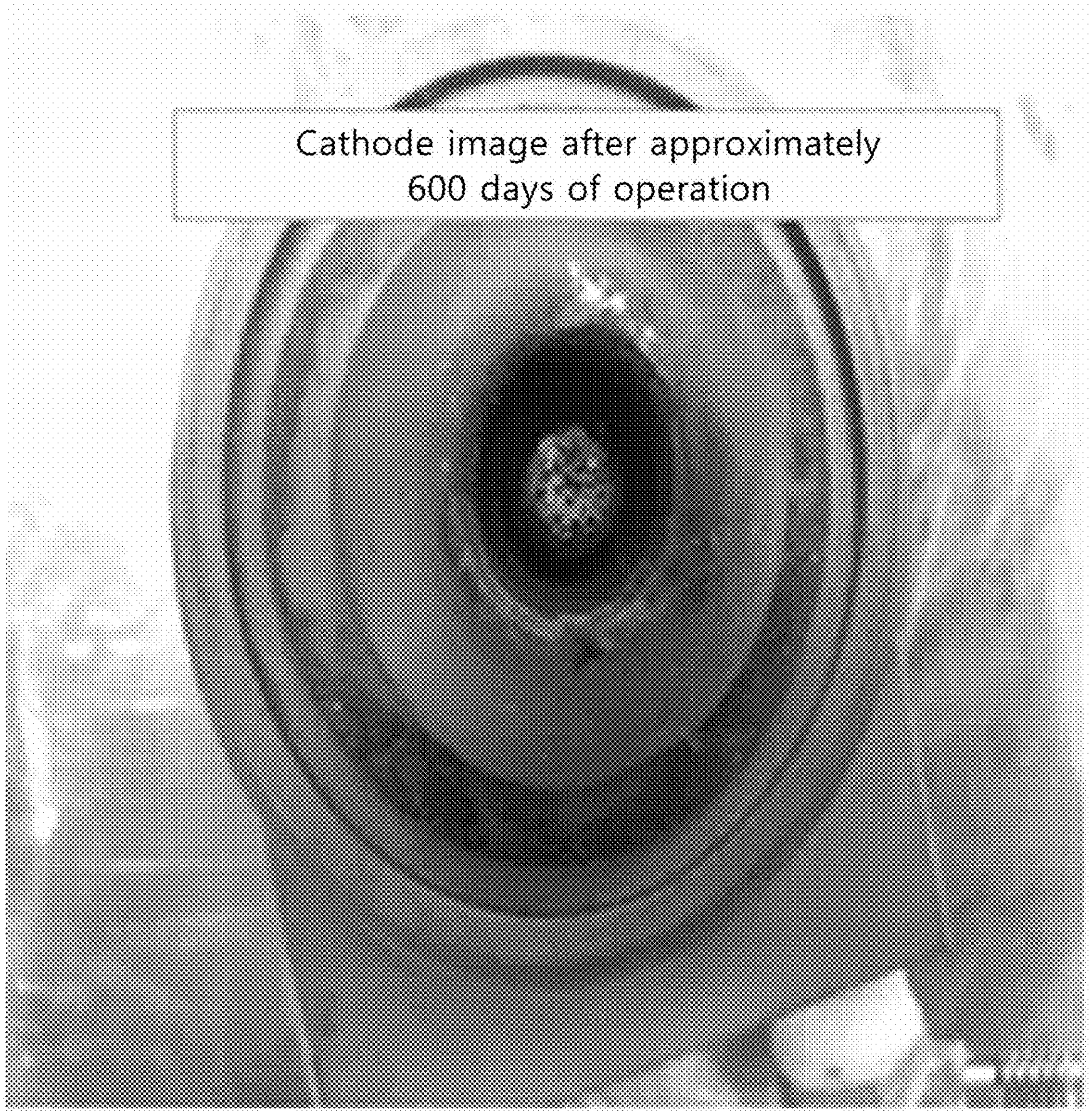
FIG. 10 is an image showing a wear state of a tungsten electrode inside the plasma torch according to an operating time at normal pressure when an orifice which is one component is not included in the plasma device according to one example embodiment of the present inventive concept (after about 600 days of operation)

FIG. 9 is an image showing a wear state of the tungsten electrode inside the plasma torch after about 250 days of operation at normal pressure when the orifice which is one component was not included in the plasma device according to one example embodiment of the present inventive concept. FIG. 10 is an image showing a wear state of the tungsten electrode inside the plasma torch after about 600 days of operation.

As shown in Table 2 and FIGS. 9 and 10, in the plasma device according to the present inventive concept, when the orifice was not installed in the connection unit, a wear length of the tungsten electrode inside the plasma torch was less than 0.5 mm even after 250 days and 600 days when the plasma device was introduced and operated in a semiconductor process at normal pressure, and thus it was confirmed that the tungsten underwent hardly any wear.

Figure 11:
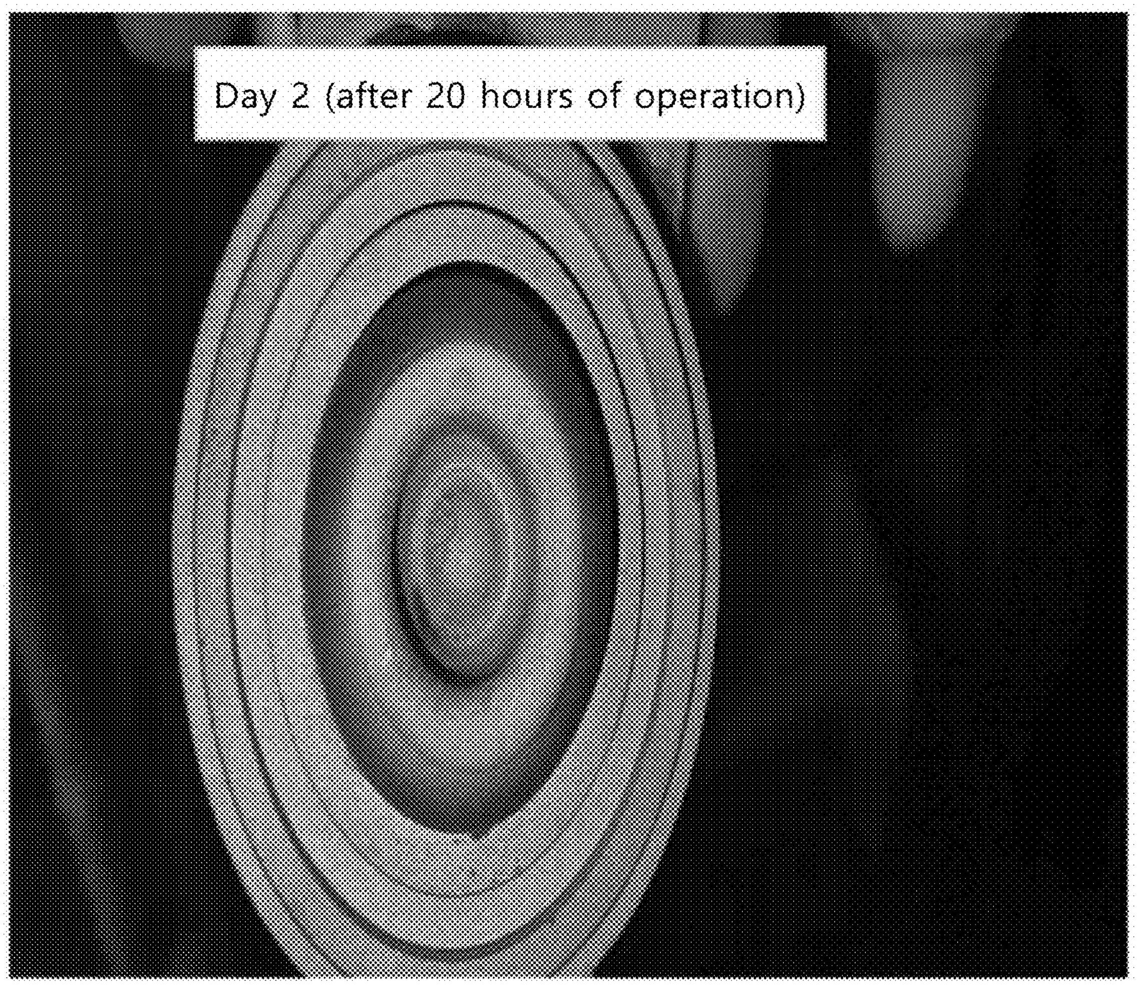
FIG. 11 is an image showing a wear state of a tungsten electrode inside the plasma torch according to an operating time at normal pressure when an orifice which is one component is included in the plasma device according to one example embodiment of the present inventive concept (day 2, after 20 hours of operation)
Figure 12:
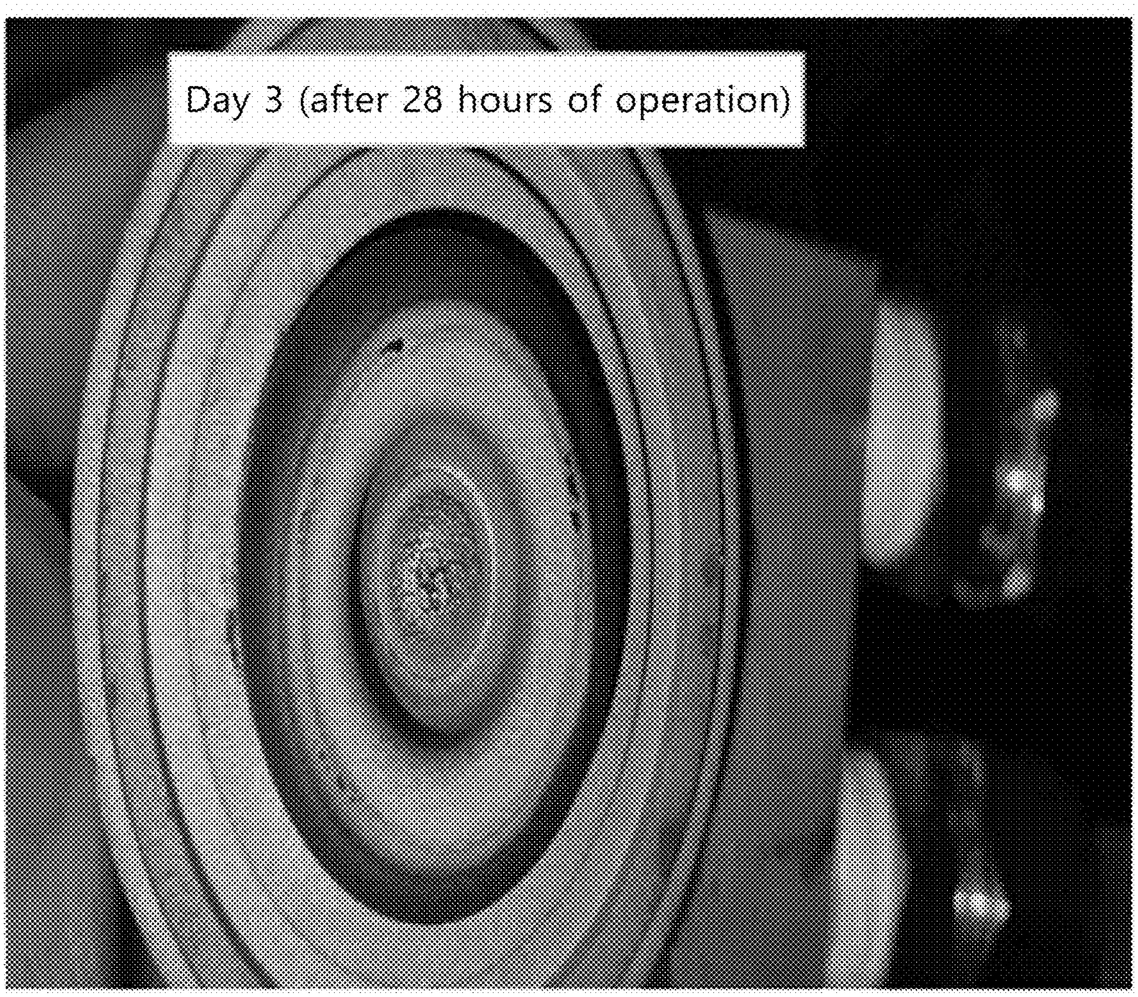
FIG. 12 is an image showing a wear state of a tungsten electrode inside the plasma torch according to an operating time at normal pressure when an orifice which is one component is included in the plasma device according to one example embodiment of the present inventive concept (day 3, after 28 hours of operation).

Next, in the plasma device according to one example embodiment of the present inventive concept, after the orifice was installed in the connection unit, a wear length of the electrode inside the plasma torch according to an operating time of the plasma device connected to the vacuum pump was measured and is shown in Table 3 and FIGS. 11 and 12.

TABLE 3

| Day | Pump $N_2$ (L/m) | Supply $N_2$ (L/m) | Current (A) | Voltage (V) | Wear length of tungsten electrode (mm) |
|---|---|---|---|---|---|
| Day 1 | 40 | 6 | 20 | 94 | 0.6 |
| Day 2 | 40 | 6 | 20 | 100 | 0.7 |
| Day 3 | 40 | 6 | 20 | 105 | 0.8 |

FIG. 11 is an image of a wear state of the tungsten electrode inside the plasma torch on day 2 after 20 hours of operation when the orifice was installed in the connection unit in the plasma device according to one example embodiment of the present inventive concept. FIG. 12 is an image of a wear state of the tungsten electrode inside the plasma torch on day 3 after 28 hours of operation.

As shown in Table 3 and FIGS. 11 and 12, in the plasma device according to the present inventive concept, when the orifice was installed in the connection unit, the wear length of the tungsten electrode in the plasma device connected to the vacuum pump was less than 1 mm even after day 3, which was equivalent to a level of wear of the tungsten electrode at normal pressure. Thus, it can be seen that, by installing the orifice in the connection unit of the plasma device, a pressure of the plasma device can be maintained similar to normal pressure by a pressure drop preventing effect.

Therefore, in a plasma device according to the present inventive concept, since an orifice is installed in a connection unit for connection with a vacuum pump to prevent a decrease in pressure of the vacuum pump, a pressure of a plasma reaction unit including a plasma torch of the plasma device can be maintained similar to normal pressure, thereby reducing the wear of a tungsten electrode in the plasma torch to extend a lifetime of the electrode.

In addition, a plasma torch in a plasma device according to the present inventive concept can generate a strong vortex by rotating a plasma-generating gas at a high speed using an arc generation portion having a cylindrical shape formed at a lower portion of a cathode body, thereby maintaining precise and stable plasma and improving gas treating efficiency even in low-power operation. The plasma generating gas can be rotated to maintain constant plasma by the arc generation portion formed in the cathode body, thereby reducing the wear of an electrode to extend a lifetime of the electrode.

Meanwhile, example embodiments of the present inventive concept shown in the present specification and drawings are for enhancing understanding and are not intended to limit the scope of the present inventive concept. It is clear to a person with ordinary knowledge in the art to which the present inventive concept belongs that other modified example embodiments based on the technical concepts of the present inventive concept are possible in addition to the disclosed example embodiments.

What is claimed is:

1. A plasma device for treating an exhaust gas, which is connected to a vacuum pump, the plasma device comprising:

a plasma reaction unit which includes a plasma torch generating a plasma, an exhaust gas injection part provided under the plasma torch and provided with the exhaust gas, a reaction chamber provided under the exhaust gas injection part and in which a decomposed gas is generated by reaction between the exhaust gas and the plasma, and a coolant chamber provided to supply a coolant to the plasma torch and the reaction chamber;

a cooling unit which is formed under and communicates with the plasma reaction unit and includes a passage and a coolant chamber configured to surround the passage, and to cool the decomposed gas; and a connection unit configured to connect the cooling unit and a vacuum pump, wherein an orifice is provided in the connection unit to prevent a pressure drop due to the vacuum pump, wherein the orifice has orifice body that is arranged in the direction of the vacuum pump to block flow of the decomposed gas, and an orifice pipe protrudes from the orifice body in the direction of the cooling unit, with a hole formed at the center of the orifice pipe, wherein the hole penetrates the orifice body and the decomposed gas is supplied to the vacuum pump.

2. The plasma device of claim 1, wherein, in the plasma reaction unit, the plasma torch, the exhaust gas injection part, and the reaction chamber are integrally formed.

3. The plasma device of claim 1, wherein the plasma torch includes:

a cathode having a solid columnar shape;

a cathode body formed to surround the cathode and including a convex portion of which a lower portion is convex;

a cover configured to cover upper portions of the cathode and the cathode body;

an anode body disposed under the cathode body to be spaced a certain distance from the cathode body;

a plasma-generating gas supply part disposed between the cathode body and the anode body and configured to supply a plasma-generating gas for generating the plasma; and a coolant supply part configured to supply the coolant to the cathode body and the anode body.

4. The plasma device of claim 3, wherein a certain portion of one lower end portion of the cathode is exposed from the cathode body.

5. The plasma device of claim 3, wherein an arc generation portion formed as a groove having a cylindrical shape is formed inside the convex portion such that a vortex of the plasma-generating gas is generated.

6. The plasma device of claim 3, wherein a discharge part having a cylindrical shape, of which a diameter increases downward, is formed inside the anode body.

7. The plasma device of claim 3, wherein the plasma-generating gas supply part includes:

a body having a ring shape provided with an internal space; and a plasma-generating gas injection pipe formed in the body to inject a gas.

8. The plasma device of claim 7, wherein:

the plasma-generating gas injection pipe is formed as two plasma-generating gas injection pipes in contact with the internal space in the body in a circumferential direction; and the two plasma-generating gas injection pipes are disposed to form an angle of 180°.

9. The plasma device of claim 7, wherein a diameter of a gas outlet of the plasma-generating gas injection pipe is less than a diameter of a gas inlet thereof.

10. The plasma device of claim 1, wherein, in the coolant chamber provided in each of the reaction chamber and the cooling unit, in order to prevent formation of gas bubbles, a coolant inlet is provided at a bottom of the coolant chamber, and a coolant outlet is provided at a top of the coolant chamber.

* * * * *